Oct. 27, 1936.                J. H. BLAIR                    2,058,556
              APPARATUS FOR MAKING TUBULAR METAL ARTICLES
                     Filed Jan. 23, 1932         5 Sheets-Sheet 1
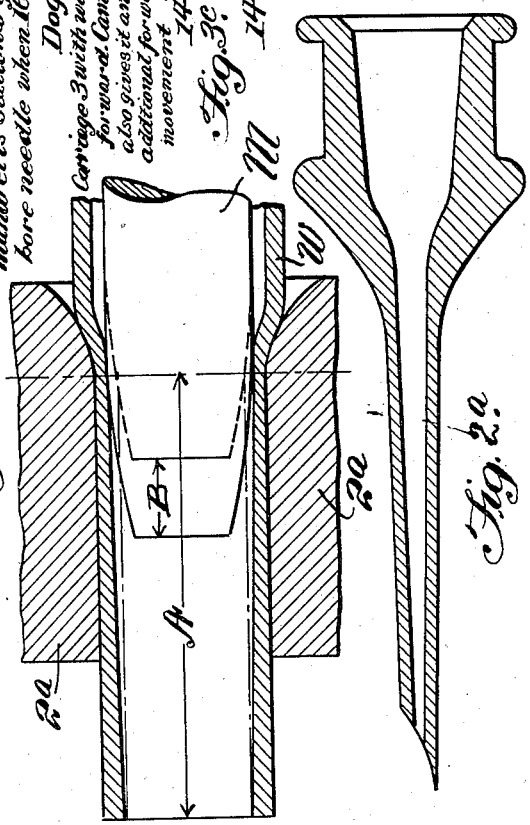
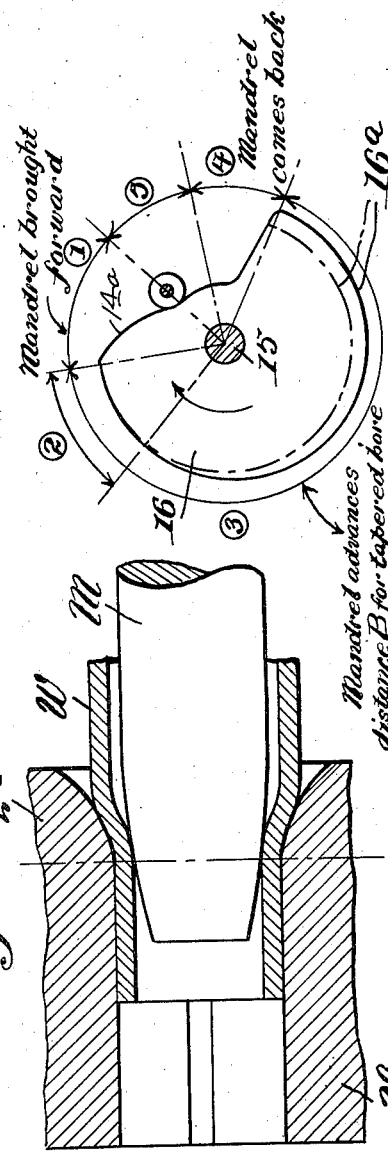

Oct. 27, 1936.  J. H. BLAIR  2,058,556
APPARATUS FOR MAKING TUBULAR METAL ARTICLES
Filed Jan. 23, 1932  5 Sheets—Sheet 2
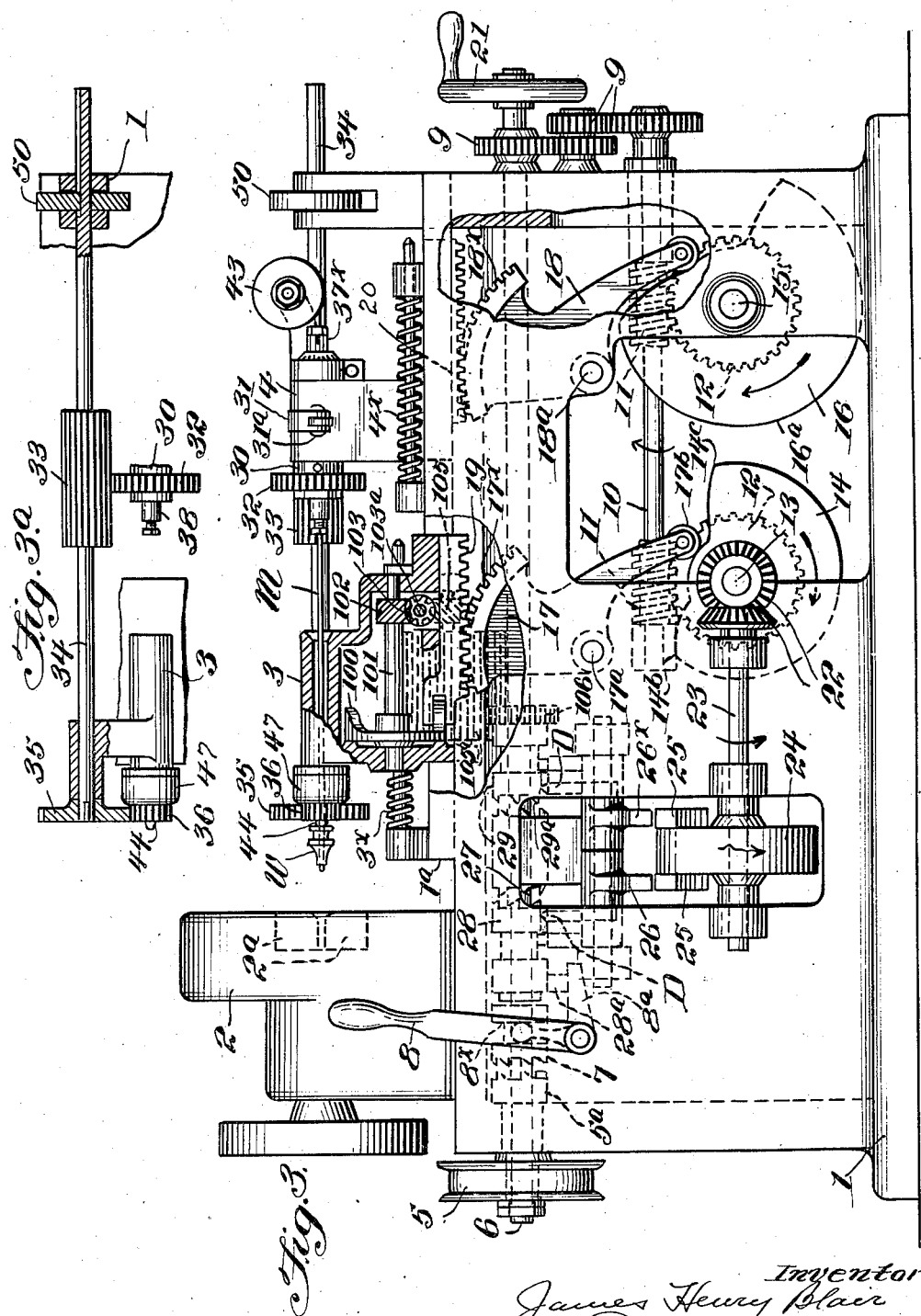
Inventor
James Henry Blair
By Spear, Donaldson & Hall
Attorneys

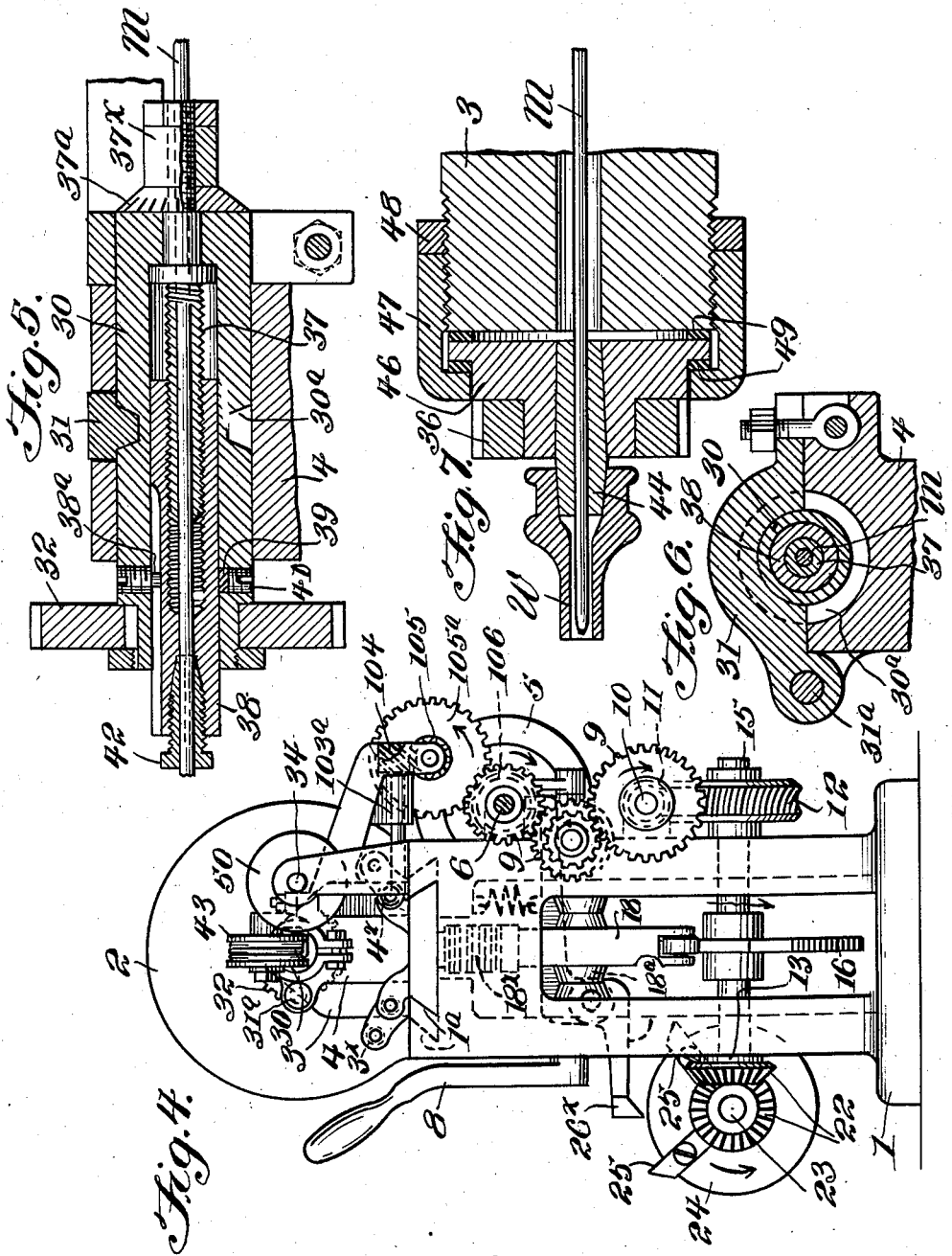

Oct. 27, 1936.  J. H. BLAIR  2,058,556
APPARATUS FOR MAKING TUBULAR METAL ARTICLES
Filed Jan. 23, 1932  5 Sheets-Sheet 4
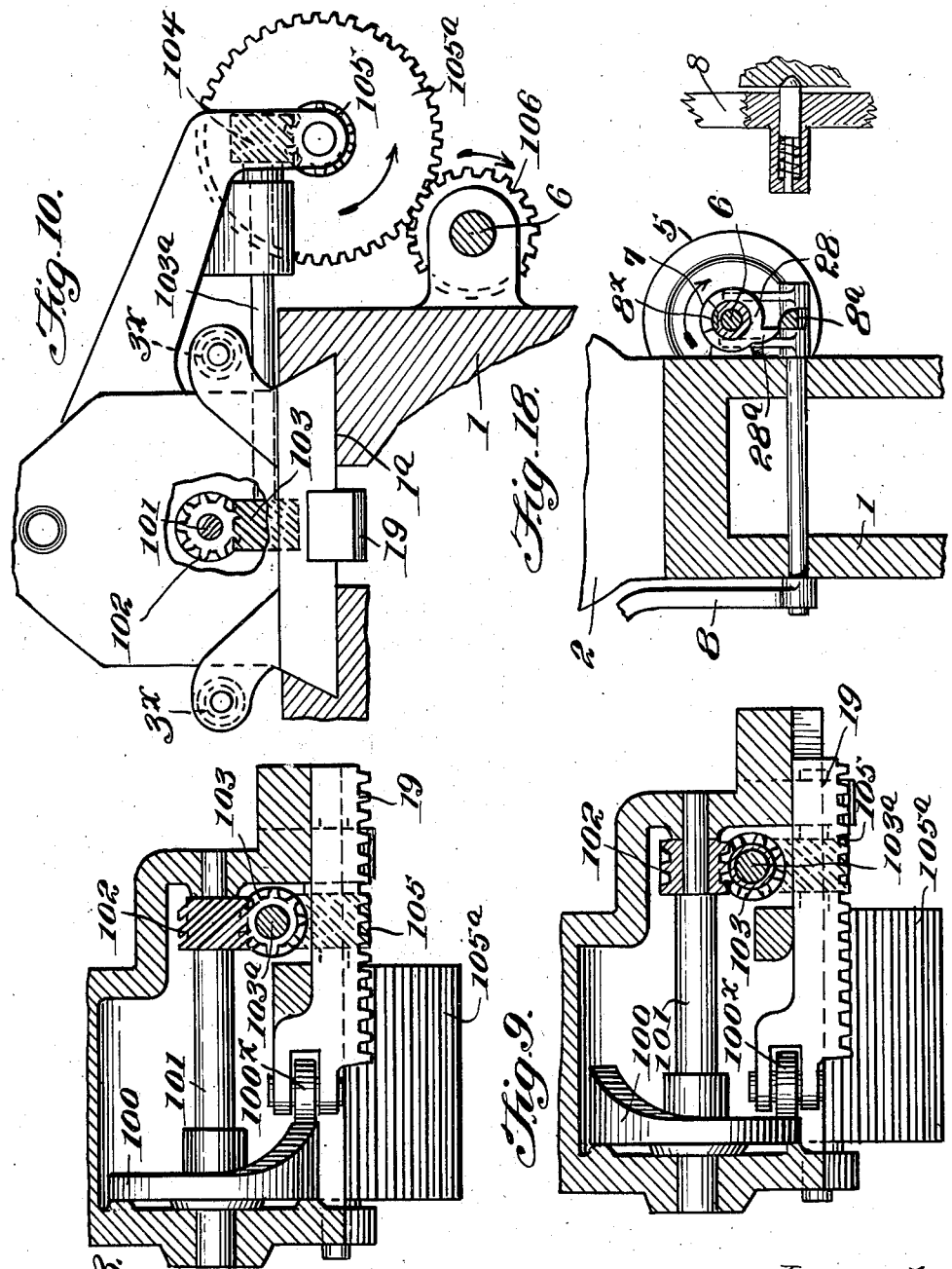
Inventor
James Henry Blair
By Spear, Donaldson & Hall
Attorneys

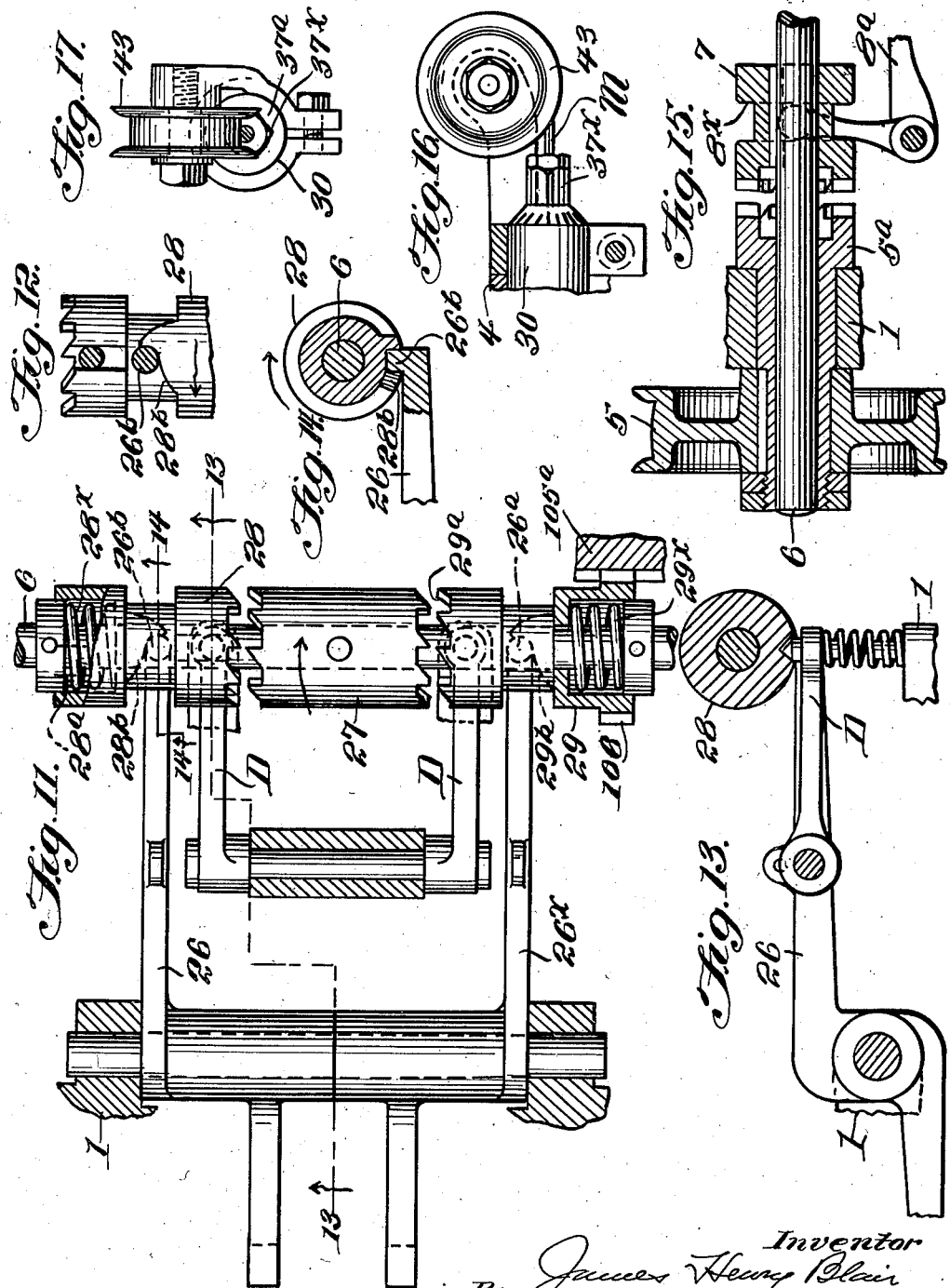

Patented Oct. 27, 1936

2,058,556

UNITED STATES PATENT OFFICE 2,058,556

APPARATUS FOR MAKING TUBULAR METAL ARTICLES

James Henry Blair, Prince Bay, N. Y., assignor of one-third to Otto J. Heinzmann, Prince Bay, N. Y., and one-third to Howard M. Groff, Great Kills, N. Y.

Application January 23, 1932, Serial No. 588,421

9 Claims. (Cl. 78—21)

The invention relates to the production of articles of tubular metal such, for instance, hypodermic needles, in one piece. The metal which my invention enables me to use is high carbon stainless steel which can be hardened and tempered to increase its strength while at the same time producing a tube with a thin wall of uniform thickness and of comparatively light weight.

The machine is of the type adapted to produce the tube of the desired diameter by rotary swaging means consisting of dies which rotate about the axis of the blank and deliver a succession of rapid, light hammer blows thereto.

The apparatus is illustrated in the accompanying drawings in which

Figure 1 is a diagrammatic view of the mandrel, portions of the swaging dies and a part of the work being operated upon.

Fig. 2 is a view similar to Fig. 1 illustrating the effect of moving the work piece and the mandrel axially during the swaging operation.

Fig. 2a is a sectional view of the finished article.

Fig. 3 is an elevation of a machine embodying the invention, partly in section.

Fig. 3a is a plan view of part of Fig. 3.

Figs. 3b, 3c and 3d are diagrams of actions.

Fig. 4 is an end view of the machine.

Fig. 5 is a sectional view of mechanism for driving and holding the rear end of the mandrel.

Fig. 6 is a detail view of latch means associated with the mandrel carriage.

Fig. 7 is a sectional detail view of part of a work support and associated parts.

Figs. 8 and 9 show the work supporting carriage in section with means for giving the same movement.

Fig. 10 is an end view of the work supporting carriage and drive connections.

Fig. 11 is a plan view partly in section of driving connections.

Figs. 12, 13, 14, 15, 16 and 17 show details of the driving connections.

Fig. 18 is a view of hand operating connections.

Fig. 19 shows a detent holding the hand lever in either position.

The machine base or frame is shown at 1. The swager head 2 may be of any suitable form. The support 3 for the work piece indicated at W and the support 4 for the mandrel indicated at M are mounted to slide in guide ways 1a at the upper part of the frame.

The swager head has dies or hammers 2a which are operated to deliver light hammer blows to the work piece, said dies being mounted to revolve around the axis of said work piece.

The apparatus is driven by a pulley 5 on the main constant speed drive shaft 6, a clutch at 7 controlled by starting lever 8 controlling the connection of the hub 5a of the pulley to the said drive shaft 6.

The lever 8 is designed to be operated by hand and when thrown to the left the machine will be operated. It is also operated automatically as will be described hereinafter.

Connected with the shaft 6 is a train of gears indicated generally at 9 by which power is transmitted to a shaft 10 carrying worms 11. This train of gears are changeable to vary the ratio of drive. The worms 11 drive worm wheels 12, 12 which are mounted respectively on shafts 13 and 15. The former shaft carries a cam 14 which operates a lever 17 pivoted at 17a. This lever has a segmental gear 17x meshing with a rack 19 on the carriage 3 for advancing the work piece in relation to the swaging dies.

The shaft 15 has a cam 16 for operating a lever 18 pivoted at 18a and having a segmental gear 18x for advancing the mandrel support or carriage 4, of the mandrel M in relation to the swaging dies. This mandrel passes through the work piece supporting carriage.

A hand wheel 21 fixed to the main drive shaft 6 serves to operate the machine by hand when setting up the machine for any desired work to be performed.

Means are provided for exercising certain automatic operations for the control of the machine as now will be referred to. The cam shaft 13 is connected through bevel gears 22 with a shaft 23 upon which a drum 24 is fixed which drum is designed to initiate certain movements of the machine in timed relation with the cams 14 and 16 which operate the work piece carriage and the mandrel carriage, such, for instance, for stopping the machine when a cycle of operation is completed for swaging the tubular work piece has been performed. The drum carries on its opposite faces adjustable dogs 25. These can be set at any desired angular distance from a zero line marked on the cams, or the point at which the machine is ready for the insertion of a new tubular blank or work piece to be swaged. When the cycle of operation upon the work piece has been completed the dog will engage the trip lever 26 and operate the same to engage the disengaging clutch 28 with the clutch driver 27 of main drive shaft 6. The disengaging clutch makes one revolution after which the trip lever withdraws it from the clutch driver 27 stopping its rotation. During the revolution of the said disengaging clutch its lug 28a strikes the arm 8a of the lever 8 throwing clutch 7 out of engagement with the drive pulley sleeve 5a thus stopping rotation of cams 14 and 16 and drum 24.

Shaft 6 is driven, as before stated, through clutch 7 splined thereto. This clutch has teeth to engage the teeth of the other clutch member 5a which is on a sleeve rotatable freely about the shaft 6 and driven by pulley 5 which is the prime mover of the machine.

The clutch member 7 is controlled by a lever 8 having associated therewith an arm which engages a groove 8x in the clutch member.

The lever 8 is operable by hand and also automatically for which latter purpose it has associated therewith an arm 8a which, when arm 28a of the shiftable toothed member 28 is brought into engagement therewith, will be operated thereby to shift the lever 8 and withdraw the clutch member 7 from the constantly rotating member 5a and thus stop the machine. The toothed member 28 is shiftable lengthwise of the shaft 6 to make its toothed portion engage with and disengage from the teeth of the block 27 fixed on the shaft 6. The member 28 is pressed along the shaft 6 by a spring 28x shown in dotted lines to make its teeth mesh with those of the block 27 for one revolution or in other words, until a cam projection 28b on the said member 28 comes in contact with a stud or projection 26b on the control lever 26 whereupon the cam incline 28b, working against said projection, will move the toothed member 28 to the left and thus disengage its teeth from the teeth of the block 27 whereupon the member 28 will remain at rest. Now when a cycle of operation is to be performed the projection 25 on drum 24 will operate lever 26 and raise its projection 26b from engagement with the cam projection 28b whereupon the member 28 will be moved rightward under the action of its spring to cause it to engage the toothed block 27 to be rotated thereby for performing a cycle or, in other words, until cam projection 28b comes around and strikes projection 26b of control lever 26 when said member 28 will be shifted leftward out of engagement with the block 27.

In order to retract the carriage 3 further than the distance that said slide or carriage is retracted by the drop on cam 14, I provide a cam 100 on a shaft 101 within said carriage, said shaft having a helical gear 102 operated by a helical gear 103 on a shaft 103a which is driven by gearing 104, 105, 105a, 106. This latter gear is carried by a shiftable toothed block 29 on shaft 6, which has teeth 29a to engage teeth on the block 27 fixed on said shaft. Gear 105a is elongated to maintain engagement with gear 26 during advance and retraction of carriage 3.

The block 29 is pressed normally towards the block 27 by a spring 29x, and it is retracted to be released from engagement with block 27 by a pin 26a on lever 26x which when set in position by the projection 25 at the right of the drum 24 will be in the path of a cam projection 29b, on member 29 so that the cam projection working against the pin will move the block 29 to the right and out of engagement with the toothed driving member 27 to stop the operation of the train of gears above mentioned. During the operation, however, of this train of gearing, the cam 100 in carriage 3 is rotated. This cam engages an abutment in the form of a roller 100x mounted on the rack 19. Fig. 8 shows the carriage 3 in advanced position relative to its rack 19 and Fig. 9 shows said carriage in retracted position relative to its rack. It will be understood therefore that when the cam 100 is rotated from the position of Fig. 8 to that of Fig. 9 the carriage will have retracted under the pressure of the return spring 3x as shown in Fig. 9. This retraction takes place in relation to the rack 19 and is an additional retracting movement beyond that which is due to the retraction of the rack itself following the dropping off of roller 17b from the high part of cam 14.

After this retracting action takes place another dog like 25 set at a proper point on drum 24 then trips lever 26x a second time thus bringing cam 100 back to normal position, together with carriage 3 as shown in Fig. 8 so that the feeding of the work to the dies can be performed.

At D are shown spring detents to determine the position of the members 28 and 29 after completing a movement.

It will be seen from the above that the drum 24 can be used for engaging clutch 29 with mechanism intended to withdraw the work support an additional amount for the insertion of a work piece longer than the rise of the cam 14 will permit.

This mechanism is necessary in order to avoid providing cams of unusually large diameter on tubes of the longer lengths, and also for the fact that the tube is considerably longer after being passed through the dies than prior to being worked upon. It also aids in reducing the idle time of the production cycle since by its means the work can be advanced rapidly to the mouth of the dies while the lever roll 17b is riding over the cam rise 14a.

The action of this mechanism occurs between the points 14c and 14b of cam 14 in the following manner. The periphery of cam 14 from points 14b to 14c is utilized in the feeding of the work through the dies. Upon the roll 17b reaching point 14c the clutch 29 is engaged with driver 27 setting into motion gear train 106, 105, 105a, 104, 103, 102 in work support slide 3. The ratio of the gearing is such as to rotate cam 100 half way decreasing distance A to B thus withdrawing the carriage an additional amount over the drop in cam 14. After work has been inserted a second movement of the cam brings it back to its starting point or advancing the slide an amount that it has been retracted on the first movement. This last action must be accomplished before lever roll 17b has reached point 14b on cam 14. This action is mostly required when making one piece needles, where the work is withdrawn from the dies.

Referring to Fig. 5, 30 is a spindle mounted to rotate in the mandrel carriage 4, it being held against longitudinal displacement relative to said carriage by the latch 31, Fig. 6, pivotally mounted on the carriage at 31a and engaging an annular groove 30a on the spindle. Within this spindle there is an arbor 38 splined to the spindle at 38a to have lengthwise movement through the bore of the spindle on adjustment. The mandrel M is fixed to this arbor by the pinch screw 42. Adjustment of the arbor lengthwise to set the mandrel in the desired relation is effected by the micrometer screw 37, which may be turned by any suitable head 37x, the scale for this micrometer adjustment being indicated at 37a. When the adjustment has been effected the arbor may be set in fixed relation to the spindle by the screw 40 bearing on a shoe 39 which in turn bears on the arbor.

The rotation of the spindle 30 with the mandrel is derived from the work piece W which in turn is rotated by the action thereon of the revolving dies 2a, 2a, though at a reduced speed in relation to the rotary speed of the dies.

For this purpose the spindle 30 has fixed thereon a gear 32 which meshes with an elongated gear 33 on the counter shaft 34. This shaft is mounted in suitable bearings on the fixed frame of the machine and is driven through a gear 35 on said counter shaft and a gear 36 fixed on the rotatable work holder 46. This work holder carries affixed thereto a taper plug 44 to which is affixed the work piece, so that the rotation of the work will, through the taper plug, rotate the work holder 46 and thus the gear 36 is rotated to drive the mandrel through shaft 34 and the gearing just mentioned. This rotation of the work piece is not at the same speed as that of the dies because the work piece is placed under resistance to lag in respect to the die revolutions. For this purpose a cap 47 embraces a portion of the work holder 46. This cap is screw threaded onto the work carriage and is locked in adjusted position by the nut or ring 48. Friction discs 49 are interposed between the work holder and the cap and work support respectively and by adjusting the cap frictional restraint may be exercised upon the work holder to allow the work to be rotated at the desired rate. The mandrel is also rotated through its frictional contact at its front end with the interior of the work piece and at its rear portion said mandrel is rotated by the train of gearing mentioned.

The mandrel may be a long length of wire locked to the arbor as above described by the pinch screw above mentioned and this affords a ready means of adjusting the mandrel lengthwise, when the forward spheroidal end of the mandrel is redressed. This wire mandrel for producing some of the finer gauge needles may consist of a thin wire wound on a reel 43 mounted on the mandrel spindle and unwound as needed. This reel is a permanent fixture and rotates with the mandrel.

The driving of the mandrel as above described at the same rotary speed of the work piece as above described eliminates torsion in the small diameter mandrel and also avoids friction between the bore of the tube and the point of the mandrel.

This is important in producing a smooth and accurately sized bore in the finished article.

In some cases where the work piece is very small in diameter and there is insufficient friction between the work and the dies to rotate the mechanism as described a drive pulley 50 may be employed to rotate the mandrel and work holder at the desired speed as practice may indicate. This pulley is on shaft 34.

The one piece needle produced by my method and machine prevents infection because there are no joints, or shoulders for the lodgment of germs, and possibility of leakage, which sometimes develops in two piece needles, is also avoided.

It is of outstanding importance also to have a needle in which the bore is tapered as in Fig. 2a, since this reduces the amount of pressure necessary to inject serum. In needles with small bores of considerable length and of one diameter friction has to be overcome and high pressure is therefore necessary.

In operation of the machine the cams 14 and 16 are adjusted to such position that the mandrel may be withdrawn far enough to insert the work piece into place. Upon starting the machine the rise on cam 16 immediately advances the mandrel to the proper position in relation to the dies before the cam 14 advances the work to swaging position. During the period when the cam 14 is advancing the work into the dies the mandrel operating lever 18 is resting on the concentric portion of the periphery of cam 16, thus maintaining the mandrel in a fixed position longitudinally. Just prior to the cam 14 and the work reaching the forward end of their travel the mandrel is withdrawn completely so that the work can be freely withdrawn, this action being necessary since the bore of the tube is now smaller than the diameter of the mandrel. When the work has been withdrawn the machine is stopped.

The above description assumes that the tube is to be produced with a bore of one diameter. If, however, it is desired to produce a tube having a tapered bore, the portion 16a of the cam 16 instead of being concentric to the axis of the cam will be in form to present a rise at this point so that as the swaging goes on the mandrel will advance slowly forward as the work is being fed into the dies. This, due also to the form of the work end of the mandrel, will produce the tapered bore as will be clear from the description as hereinafter set forth.

Referring to Figs. 1 and 2. The work end of the mandrel is specially formed of spheroidal shape. When this is adjusted in a prescribed relation to the dies, as in Fig. 1, and held longitudinally stationary, but positively rotated at the same speed and in the same direction as the work, a tube will be produced of uniform bore throughout. If adjusted to another position and held against longitudinal movement a tube of another bore diameter will be produced which also will be uniform throughout.

This same mandrel, if rotated with the work and at the same time advanced axially into the dies, will produce a tapered bore.

For instance, if the mandrel is fed a distance B, while the tube travels a distance A, the resultant bore will be tapered as shown in Fig. 2.

It will be seen from the above that the mandrel is not used to rotate the work, but, on the contrary, the mandrel is driven by the frictional contact between it and the work at its front portion, and at the rear portion the mandrel is driven positively but in unison with the work, the gear drive deriving its rotary motion from rotating work holder 46, which in turn derives its rotation from that of the forward end of the work and the mandrel or an independent drive like the part 50 may be used. This enables small tubing to be made. The mandrel is rotated at the same speed at both ends thereof and torsional twist is avoided.

With my invention it is not necessary to use a different mandrel for each of several different diameters of bore desired because by adjusting the mandrel having the work end portion gradually reduced towards the extreme end, it is possible to get any size bore within the limits of the work end portion of the mandrel, or the bore may be tapered as above described.

Supposing that the small end of the mandrel is .005″ and the large diameter portion .013″, a bore can be obtained anywhere from .006″ in diameter running the entire length to .012″ in diameter the entire length by adjusting the position of the end of the mandrel in relation to the mouth of the die. Should it be desired to produce a bore .006″ in diameter at one end and .012" in diameter at the other merely by advancing the mandrel slowly towards the die as the tube is fed through, this can be accomplished by the present machine.

By my means for swaging on the spheroidal end portion of the mandrel a smooth finish to the wall of the bore is obtained so that after the heat treatment on the high carbon stainless steel the bore can be polished by passing through said bore a polishing mixture, or if preferred a method of hardening and tempering may be employed which shall avoid any pitting or scaling of the surface of the bore thus preserving the original polish and smoothness imparted thereto by the swaging process. With my method and machine hollow needles or the like can be produced from steel having a sufficiently high carbon content to permit hardening and tempering by heat treatment. In hypodermic needles which run to fine gauges it is important that it has strength. The needle produced by the method hereindisclosed can be hardened and tempered to increase its strength thus decreasing the chances of bending or breaking. In addition to heat treating to gain strength of cross section it is possible, in tubes of uniform bore, to secure an unvarying wall thickness since the method produces a tube in which the exterior diameter is concentric with the bore. In this way no one section of the tube is weaker than the other, a feature which tends to obviate bending or buckling when under the pressure of insertion. The needle when finished is chisel pointed.

The carriages or supports 3 and 4 are returned to normal position by springs 3x and 4x.

The work piece has a taper socket receiving the plug 44 and the frictional engagement between these parts when the work piece is wrung onto the plug is sufficient to hold the work piece against turning on the plug.

Likewise, the plug 44 is held in work holder 46 by frictional engagement. Other means of fastening may be employed in larger units.

The general operation is as follows: We will suppose the machine to be at rest with a new needle blank inserted into place on the work support and the machine ready to start. At this time the clutch member 28 is in neutral position at the left of its axial stroke with its teeth out of engagement with the teeth of the block 27, in which position said clutch member is being retained against the tendency of its spring to force it rightward by the projection 26b on the lever 26, engaging the cam projection 28b of said clutch. At this time also the projection 28a of the clutch 28 is in neutral position out of contact with arm 8a of the hand lever 8. Furthermore, at this time the clutch member 29 is in its extreme rightward position out of engagement with the toothed block 27, it being held in this position against the tension of its spring 29x, stressing it to move leftward, by the projection 26a on one of the levers 26 engaging the cam projection 29b.

The operator now throws hand lever 8 leftward, moving splined clutch 7 into engagement with the clutch section 5a of pulley 5. This causes the rotation of shaft 6, which transmits its motion to cam shafts 13 and 15, with their cams 14 and 16. The mandrel is now advanced to its forward position by the cam 16, operating lever 18 and rack 20 of the carriage 4, and the cam 14 will advance the work holder 3 through the operation of segment 17x and rack 19. Before, however, the cam 14 brings its high point 14b against the roller 17b of the segment lever 17, or in other words, during the advance of the carriage by means of cam 14 and the connections operated thereby, the mechanism involving the cam 100 within the carriage will have been operated to restore the carriage to its advanced position in relation to its rack 19. This action will be due to one of the dogs 25 on drum 24 tripping the clutch member 29, so that its springs 29x will throw it into engagement with the tooth block 27, which is now in rotation. The carriage now will have been brought to its full advanced position to present the work to the dies by the conjoint action of the cam 14 and the cam 100, the latter cam restoring the carriage 3 into normal relation to its rack 19. The clutch 29 will be thrown out of operation when it has made one revolution and has completed the restoration forwardly of the carrier 3 relatively to its rack. This throwing out action will be due to the pin 26a having been restored into the path of the cam projection 29b. After the swaging action has been completed, the clutch 29 is again tripped by a dog on drum 24 operating one of the levers 26 and withdrawing the pin 26a, whereupon said clutch, will engage the toothed block 27 and will be driven thereby. This will rotate the train of gearing leading to the cam 100, which upon being turned will effect the retraction of the carriage rearwardly relative to its rack, so that said carriage eventually will stand in retracted position relative to the swaging dies at a greater distance than would be the case if reliance were had solely upon cam 14 operating the rack 19. In other words, the complete retracted position of the work carriage is due to the retracting movement of rack 19 plus the retracting movement of the carriage in relation to said rack.

I claim:

1. In apparatus of the class described, rotary swaging die means, a mandrel, a work holder rotatable by the rotary die means through the work piece, and a connection from the rotary work holder to the rear portion of the mandrel for imparting rotary motion thereto, substantially as described.

2. In combination, die means, a carriage for advancing the work piece to and retracting it from the die means, a cam with connections to the carriage for operating the same relative to the die means, and mechanism for giving the carriage a retracting and advancing movement in addition to its main movements backward and forward relative to the dies under the action of said cam and connections.

3. Apparatus according to claim 2 in which the said connection includes a rack and gear, and said mechanism for giving the said added movements to the carriage includes a cam carried by the carriage and an abutment on the rack engaged by said cam, substantially as described.

4. Apparatus according to claim 2 in which a clutch intermittently operates said mechanism for giving the carriage its additional movement, with means for throwing said clutch into and out of operative engagement with a driving member therefor, substantially as described.

5. In an apparatus of the class described for producing tubular articles of uniform external diameter, a rotary swaging die head having reciprocating striking elements movable radially inwardly a fixed distance, and a mandrel, the striking face of each element having a portion substantially parallel with the axis of the mandrel and an outwardly flared portion at its work entering end, said mandrel extending away from said flared face portion of the striking elements toward the direction from which the work is fed, and having its end terminating intermediate the ends of the die means so that the parallel portion of the striking face extends beyond the mandrel to effect a smoothing action on the work piece.

6. An apparatus according to claim 5 in which the mandrel is convergently curved toward said end and means is provided to progressively relatively adjust the position of the curved portion of the mandrel axially with respect to the flared portion of the striking elements to thereby vary the internal diameter of the tubular work piece.

7. In a machine for making tubular members of small diameter, rotary swaging die means, a work holder having means for causing its rotation at a different speed from the speed of rotation of the die means, a mandrel extending between the die means, and a driving connection between the work holder and a portion of the mandrel apart from the die means to cause rotation of the mandrel at the same speed as the work piece.

8. Apparatus according to claim 7 in which the end portion of the mandrel is convexly curved from a zone of full diameter to the end of smaller diameter and said dies are disposed to hammer on the convexly curved end portion only.

9. In apparatus of the class described, a rotary swaging die means, a mandrel for sizing the bore of the work piece, and presenting the same to the swaging means, a work holder receiving its rotation from the die means, means for yieldably restraining rotary motion of the work holder to a less speed than the speed of the rotary die means, and a connection between the restrained work holder to the rear portion of the mandrel for rotating said mandrel from the work holder, substantially as described.

JAMES HENRY BLAIR.